(12) United States Patent
Song et al.

(10) Patent No.: US 10,637,365 B2
(45) Date of Patent: Apr. 28, 2020

(54) FLYBACK CONVERTER AND CONTROL METHOD THEREOF

(71) Applicant: Delta Electronics, Inc., Taoyuan, Taiwan (CN)

(72) Inventors: Haibin Song, Taoyuan (CN); Daofei Xu, Taoyuan (CN); Jinfa Zhang, Taoyuan (CN)

(73) Assignee: Delta Electronics, Inc., Taoyuan, Taiwan (CN)

( * ) Notice: Subject to any disclaimer, the term of this patent is extended or adjusted under 35 U.S.C. 154(b) by 0 days.

(21) Appl. No.: 16/385,138

(22) Filed: Apr. 16, 2019

(65) Prior Publication Data

US 2019/0356232 A1 Nov. 21, 2019

(30) Foreign Application Priority Data

May 21, 2018 (CN) .......................... 2018 1 0490851

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0009* (2013.01)

(58) Field of Classification Search
CPC . H02M 2001/0032; H02M 2001/0035; H02M 1/08; H02M 2001/0009
See application file for complete search history.

(56) References Cited

U.S. PATENT DOCUMENTS

| | | | |
|---|---|---|---|
| 9,209,702 B2 | 12/2015 | Ren et al. | |
| 9,823,617 B2 | 11/2017 | Shimura et al. | |
| 2015/0229199 A1* | 8/2015 | Lu | H02M 3/33507 363/21.12 |
| 2017/0310227 A1* | 10/2017 | Zhang | H02M 3/1584 |

(Continued)

FOREIGN PATENT DOCUMENTS

| | | |
|---|---|---|
| CN | 101998728 B | 9/2013 |
| CN | 103715899 A | 4/2014 |

(Continued)

OTHER PUBLICATIONS

The TW1OA dated Dec. 4, 2019 by the TW Office.

*Primary Examiner* — Alex Torres-Rivera
(74) *Attorney, Agent, or Firm* — Yunling Ren (57) ABSTRACT

A flyback converter includes: a transformer, including a primary winding and a secondary winding; a primary side switch electrically coupled to the primary winding; a feedback circuit, configured to detect an output voltage of a load and output a feedback voltage signal; a current detecting circuit, configured to sample current flowing through the primary side switch and output a current signal; and a control circuit, coupled to the feedback circuit and the current detecting circuit and configured to respectively receive the feedback voltage signal and the current signal, and output a switch control signal to the primary side switch; and wherein the control circuit configured to control a switching frequency of the primary side switch to increase with increase of an output power, and an increasing speed of the switching frequency to decrease with the increase of the output power.

18 Claims, 8 Drawing Sheets

(56) References Cited

U.S. PATENT DOCUMENTS

2018/0351464 A1\* 12/2018 Finkel ............... H02M 3/33507
2019/0238054 A1\* 8/2019 Flaibani ................ H02M 3/156

FOREIGN PATENT DOCUMENTS

| CN | 101592965 B | 7/2014 |
| CN | 103138587 B | 5/2017 |
| TW | I393336 B | 4/2013 |
| TW | M490170 U | 11/2014 |
| TW | I531141 B | 4/2016 |
| TW | I623185 B | 5/2018 |

\* cited by examiner

FLYBACK CONVERTER AND CONTROL METHOD THEREOF

CROSS REFERENCE

This application is based upon and claims priority to Chinese Patent Application No. 201810490851.7, filed on May 21, 2018, the entire contents thereof are incorporated herein by reference.

TECHNICAL FIELD

The present disclosure relates to a converter, and more particularly, to a flyback converter which can improve efficiency of light load condition and acoustic noise simultaneously and a control method thereof.

BACKGROUND

Flyback converter has been widely used in low power supplies, especially in power supply below 100 W, due to its simple structure and low cost, etc.

For the flyback converter with quasi-resonant (QR) control mode and discontinuous current mode (DCM), the relation between the output power $P_o$ and the switching frequency $f_s$ satisfies the following formula:

$$P_o = \tfrac{1}{2} L_m I_{pk}^2 f_s \tag{1}$$

Wherein Po is the output power; $L_m$ is the inductance value of primary winding of a transformer; $I_{pk}$ is a peak value of the current flowing through a primary side switch; fs is the switching frequency of the primary side switch. For a given output power $P_o$, the switching frequency $f_s$ may be reduced by setting a larger peak value of the current $I_{pk}$.

Further, a VCO (Voltage Controlled Oscillator) frequency reduction control mode is provided in related art. A lower switching frequency $f_s$ at light-load condition may be obtained by setting a larger preset current value $I_{PK\_VCO}$, according to which the peak value of the current $I_{pk}$ is controlled. The Formula (2) is obtained as below:

$$f_s = \frac{2}{L_m I_{PK\_VCO}^2} P_o \tag{2}$$

For a fixed preset current value $I_{PK\_VCO}$, the switching frequency $f_s$ is proportional to the output power $P_o$. When the output power $P_o$ is reduced to a certain value, the switching frequency $f_s$ may be reduced below 20 kHz and enters into an audio frequency range, which causes acoustic noise. In order to resolve this issue, a control method of burst mode is provided. When $f_s$ is reduced to a preset frequency value $f_{s\_BST}$ ($f_{s\_BT}>20$ kHz), $f_s$ remains unchanged. Then the output power $P_o$ can be decreased by reducing the working time of the flyback converter.

Figure 1:
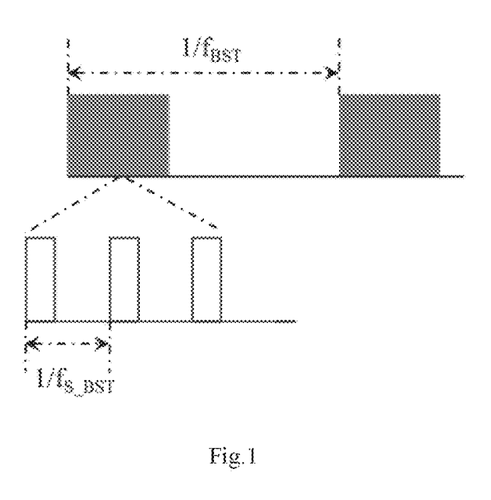
FIG. 1 is a schematic diagram of driving signal of a flyback converter in burst mode.

In the burst mode, the output power $P_o$ satisfies the following formula:

$$P_o = E_{BST} f_{BST} \tag{3}$$

Wherein $E_{BST}$ represents energy transferred by each cluster of pulse train, $f_{BST}$ represents frequency of the cluster of pulse train, as shown in FIG. 1. Generally, the larger the energy, the louder the acoustic noise. For a certain burst mode frequency $f_{BST}$ from Formula (3), the energy $E_{BST}$ transferred by each cluster of pulse train is proportional to the output power $P_o$.

Therefore, in a non-burst mode, for any output power $P_o$, the larger the preset current value $I_{PK\_VCO}$, the smaller the switching frequency $f_s$, and the higher efficiency at light load condition can be achieved referring to Formula (2). However, when entering into the burst mode, as shown in FIG. 1, the $f_s$ is arranged to be at $f_{s\_BST}$ and remains unchanged, so the larger the preset current value $I_{PK\_VCO}$, the larger output power $P_o$. For a fixed $f_{BST}$, the larger the output power $P_o$, the larger the energy $E_{BST}$ transferred by each cluster of pulse train, and the louder the acoustic noise.

So for better efficiency at light load condition, the preset current value $I_{PK\_VCO}$ needed to be set higher. However, for better acoustic noise performance, the preset current value $I_{PK\_VCO}$ needs to be set lower. Therefore, there is a dilemma between efficiency and acoustic noise with conventional control methods.

SUMMARY

One aspect of the present disclosure is provided a flyback converter. The flyback converter includes a transformer, including a primary winding and a secondary winding; a primary side switch electrically coupled to the primary winding; a feedback circuit, configured to detect an output voltage of a load and output a feedback voltage signal; a current detecting circuit, configured to detect the current flowing through the primary side switch and output a current signal; and a control circuit, coupled to the feedback circuit and the current detecting circuit and configured to respectively receive the feedback voltage signal and the current signal, and output a switch control signal to control a switching frequency of the primary side switch to increase with increase of an output power, but an increasing speed of the switching frequency to decrease with the increase of the output power.

Another aspect of the present disclosure is a control method for a flyback converter. The control method includes: detecting an output voltage of a load and generating a feedback voltage signal; detecting a current flowing through a primary side switch and generating a current signal; and generating a switch control signal based on the feedback voltage signal and the current signal to control a switching frequency of the primary side switch to increase with increase of an output power, but an increasing speed of the switching frequency to decrease with the increase of the output power.

It should be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate embodiments conforming to the present disclosure and together with the description serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Exemplary embodiments will be described more comprehensively by referring to accompanying drawings now. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

Furthermore, the accompanying drawings are merely schematic illustrations of the present disclosure. Same or similar parts are denoted by same reference numbers in the drawings and, thus, a detailed description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

A detailed description of the exemplary embodiments of the present disclosure will be made in the following with reference to the accompanying drawings.

Figure 2:
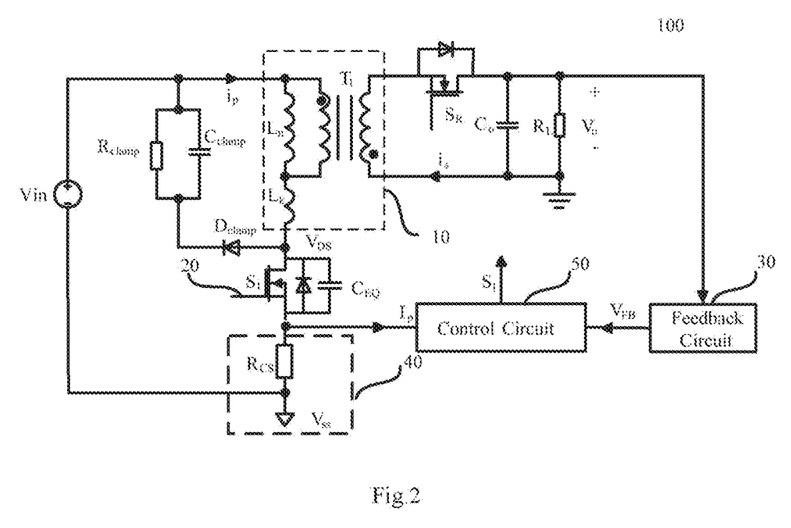
FIG. 2 is a schematic diagram of a flyback converter according to an embodiment of the present disclosure.

FIG. 2 is a schematic diagram of a flyback converter according to an embodiment of the present disclosure. As shown in FIG. 2, the flyback converter 100 includes a transformer 10, a primary side switch 20, a secondary side switch $S_R$, an output capacitor $C_o$. The transformer 10 includes a primary winding coupled to an input source Vin and a secondary winding coupled to a load $R_L$. The primary side switch 20 is electrically to the primary winding and the secondary side switch $S_R$ is electrically to the secondary winding. The output capacitor $C_o$ is coupled in parallel with the load. When the primary side switch 20 is turned on, a current flows through the primary winding and energy is stored in the transformer. When the primary side switch 20 is turned off, the secondary side switch $S_R$ is forward-biased, and the energy stored in the transformer is released through the secondary winding to output capacitor and the load.

Further, the flyback converter 100 includes a feedback circuit 30, a current detecting circuit 40 and a control circuit 50. The feedback circuit 30 is configured to detect an output voltage $V_o$ of the load $R_L$ and output a feedback voltage signal $V_{FB}$ to the control circuit 50. The current detecting circuit 40 is coupled between the primary side switch 20 and a primary ground terminal $V_{SS}$ and configured to detect the current flowing through the primary side switch 20 and output a current signal $I_p$ to the control circuit 50. The control circuit 50 is coupled to the feedback circuit 30 and the current detecting circuit 40, and output a switch control signal $S_1$ according to the feedback voltage signal $V_{FB}$ and the current signal $I_p$. The control circuit 50 controls a switching frequency $f_s$ of the primary side switch 20 to increase with increase of an output power $P_o$, but an increasing speed of the switching frequency $f_s$ to is decrease with the increase of the output power $P_o$, i.e., to control a derivative $df_s/dP_o$ of the switching frequency $f_s$ with respect to the output power $P_o$ to decrease with increase of the switching frequency $f_s$.

In some embodiments, the switching frequency $f_s$ of the primary side switch 20 is great than or equal to a threshold. In an exemplary embodiment of the present disclosure, the threshold is greater than or equal to 20 kHz.

As shown in FIG. 2, the current detecting circuit 40 provides the current signal $I_p$ to the control circuit 50, and the feedback circuit 30 provides the feedback voltage $V_{FB}$ to the control circuit 50. So the control circuit 50 can regulate the switching frequency and the peak value of the current simultaneously to ensure higher peak value of the current and lower switching frequency before the flyback converter enters into a burst mode. Meanwhile, when the flyback converter enters into the burst mode, lower output power can be guaranteed. So light load efficiency performance and acoustic noise performance can be improved simultaneously.

Figure 3:
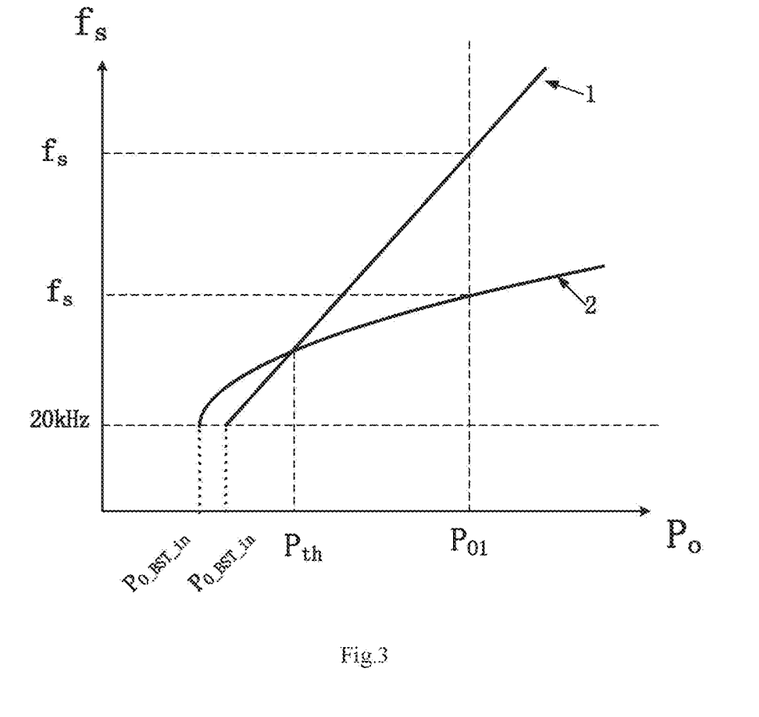
FIG. 3 is a schematic diagram of comparison of relationship between output power and switching frequency of a flyback converter in related technologies and of a flyback converter according to an embodiment of the present disclosure.

FIG. 3 is a schematic diagram of comparison of relationship between output power Po and switching frequency fs of a flyback converter in related technologies and of a flyback converter according to an embodiment of the present disclosure.

Referring to FIG. 3, in the existing VCO control mode, the peak value of the current flowing through the primary side switch is fixed on a preset current value $I_{PK\_VCO}$, and a derivative of the switching frequency $f_s$ with respect to the output power $P_o$ is a fixed value (the slope of curve of the switching frequency $f_s$ with respect to the output power $P_o$ is fixed as shown in Curve 1).

In embodiments of the present disclosure, the slope of curve of the switching frequency $f_s$ with respect to the output power $P_o$ is changed with the change of the output power $P_o$ by simultaneously controlling the peak value of the current $I_{pk}$ and the switching frequency $f_s$. Specifically, the slope of curve is reduced with the increase of the output power $P_o$, that is, the slope of curve is reduced with the increase of the switching frequency $f_s$. So the relation between the switching frequency $f_s$ and the output power $P_o$ is adjusted into form in Curve 2 as shown in FIG. 3, such that the flyback converter keeps a higher peak value of the current and a lower switching frequency before it enters into the burst mode and the flyback converter has a lower output power when it enters into the burst mode. In this way, the dilemma of acoustic noise and light load efficiency can be solved.

Different from a constant slope of curve 1 in the conventional VCO control mode, the adjusted slope of curve 2 of present disclosure is gradually decreased with the increase of the output power $P_o$. As shown in FIG. 3, when the output power $P_o > P_{th}$, for the same output power $P_{o1}$, the switching frequency $f_s$ of the present disclosure is lower, such that a better efficiency at light load condition may be obtained.

Meanwhile, the slope of curve 2 is increased with the decrease of the output power. Therefore, when the flyback converter enters into the burst mode at the frequency of 20 kHz, the flyback converter of the present disclosure may have a lower output power $P_{O\_BST\_in}$, and thus a better acoustic noise performance may be obtained.

Figure 4:
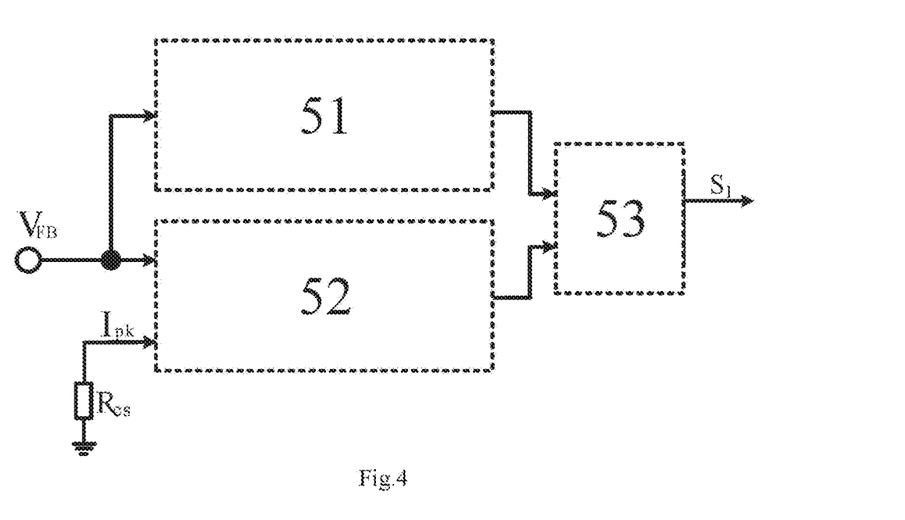
FIG. 4 is a block diagram of control circuit of a flyback converter according to an is embodiment of the present disclosure.

FIG. 4 is a circuit diagram of a control circuit 50 of a flyback converter according to an embodiment of the present disclosure. Referring to FIG. 4, the control circuit 50 of the flyback converter includes a frequency regulator 51, a current regulator 52 and a switch signal regulator 53. The frequency regulator 51 is configured to receive the feedback voltage signal $V_{FB}$ and output a frequency control signal. Wherein a first input terminal of the current regulator 52 is configured to receive the feedback voltage signal $V_{FB}$, and a second input terminal of the current regulator 52 is configured to receive the current signal $I_p$ and output a peak current control signal. The switch signal regulator 53 is configured to respectively receive the frequency control signal and the peak current control signal and output the switch control signal $S_l$ to a control terminal of the primary side switch.

Figure 5:
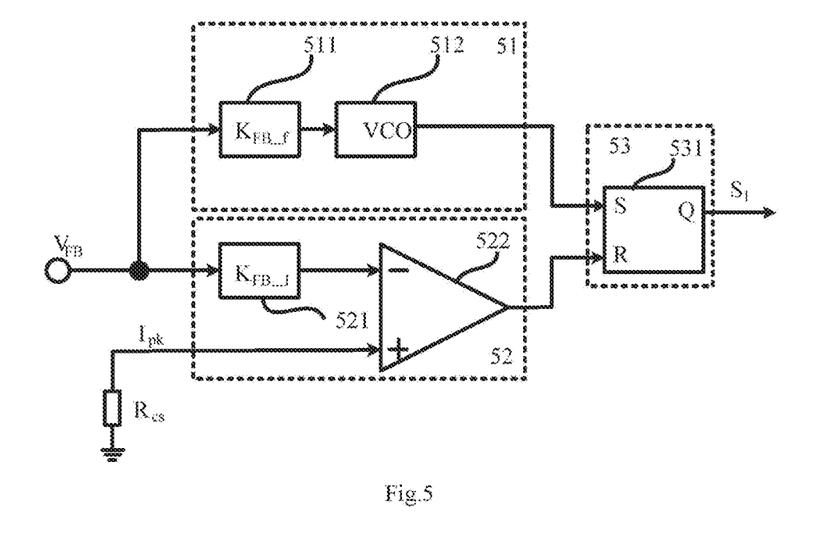
FIG. 5 is a schematic diagram of control circuit according to an embodiment of the present disclosure.

FIG. 5 is one embodiment of the control circuit 50 as shown in FIG. 4. Referring to FIG. 5, the frequency regulator 51 may include a first regulator 511 and a voltage-controlled oscillator 512. The first regulator 511 is configured to receive the feedback voltage signal $V_{FB}$ and then output a first control signal, and the first regulator 511 has a first regulation coefficient $K_{FB\_f}$ greater than zero. The voltage-controlled oscillator 512 is configured to receive the first control signal and output the frequency control signal.

Further, the current regulator 52 may include a second regulator 521 and a comparator 522. The second regulator 521 is configured to receive the feedback voltage signal $V_{FB}$ and then output a second control signal, and the second regulator 521 haves a second regulation coefficient $K_{FB\_I}$ greater than zero. An inverting input terminal of the comparator 522 is configured to receive the second control signal, and a noninverting input terminal of the comparator 522 is configured to receive the current signal $I_p$, and the comparator 522 outputs the peak current control signal.

Furthermore, the switch signal regulator 53 includes a trigger 531, wherein a first input terminal of the trigger 531 is coupled to the frequency regulator 51, a second input terminal of the trigger is coupled to the current regulator 52, and an output terminal of the trigger 531 is coupled to the control terminal of the primary side switch 20.

In this embodiment as shown in FIG. 5, both the peak value $I_{pk}$ of the current signal $I_p$ and the switching frequency $f_s$ are controlled by the feedback voltage $V_{FB}$, and Formula (4) and (5) may be obtained:

$$V_{FB}K_{FB\_I} = R_{CS}I_{pk} \quad (4)$$

$$f_s = K_{FB\_f}V_{FB} \quad (5)$$

wherein $K_{FB\_f}$ is a first regulation coefficient, $K_{FB\_I}$ is a second regulation coefficient, both of which are positive values and $R_{cs}$ is a current sensing resistance.

Based on Formula (1), (4) and (5), the following relation between the switching frequency $f_s$ and the output power $P_o$ can be obtained:

$$P_o = \frac{1}{2}L_m\left(\frac{K_{FB\_I}}{K_{FB\_f}R_{CS}}\right)^2 f_s^3 \quad (6)$$

Based on Formula (6), a first-order derivative of the switching frequency $f_s$ with respect to the output power $P_o$ may be obtained, that is, the slope of $f_s$ with respect to $P_o$ is as below:

$$\frac{df_s}{dP_o} = \frac{1}{Kf_s^2} \quad (7)$$

wherein:

$$K = \frac{3}{2}L_m\left(\frac{K_{FB\_I}}{K_{FB\_f}R_{CS}}\right)^2 \quad (8)$$

As can be known from Formula (7), when $f_s > 0$, the first-order derivative of the switching frequency $f_s$ with respect to the output power $P_o$ is decreased with the increase of $f_s$, that is, the slope of the switching frequency $f_s$ with respect to the output power $P_o$ is decreased with the increase of output power $P_o$. By setting different first regulation coefficients $K_{FB\_f}$ and second regulation coefficients $K_{FB\_I}$, different $P_{th}$ and output power points $P_{O\_BST\_in}$ may be achieved.

Figure 6A:
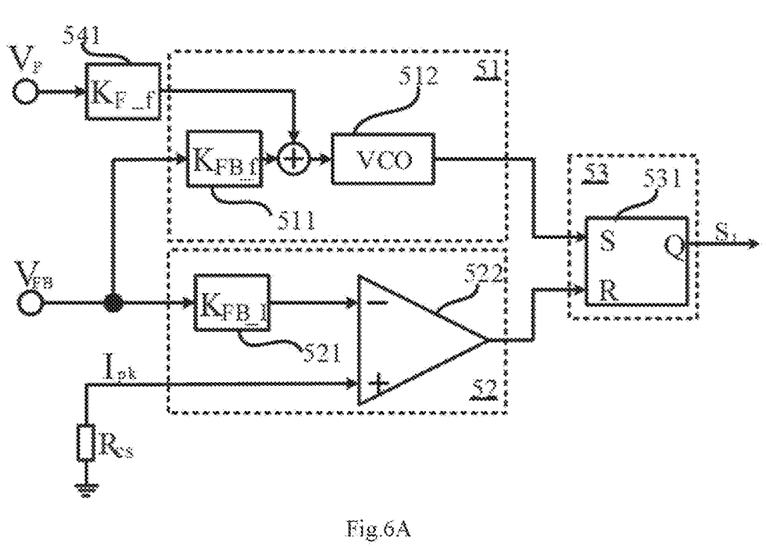
FIG. 6A~FIG. 6C are schematic diagrams of control circuit according to three embodiments of the present disclosure.
Figure 6B:
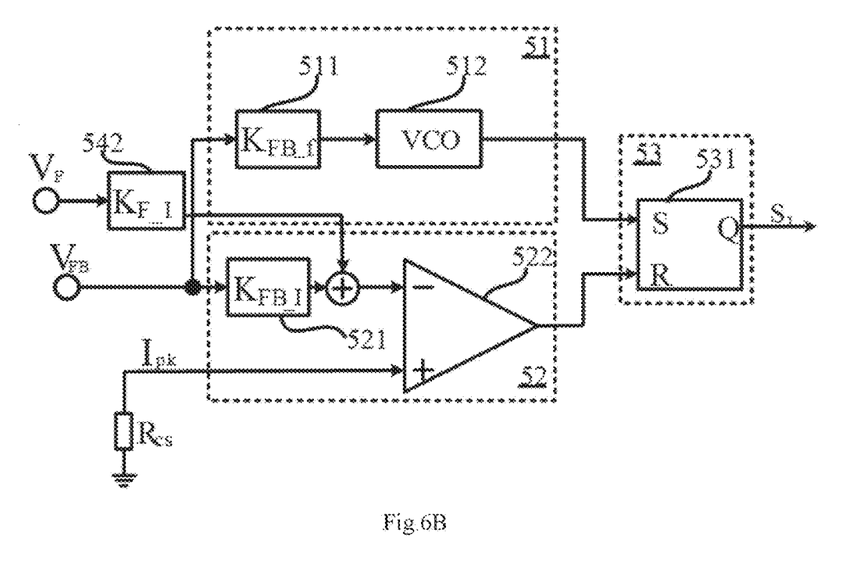
Figure 6C:
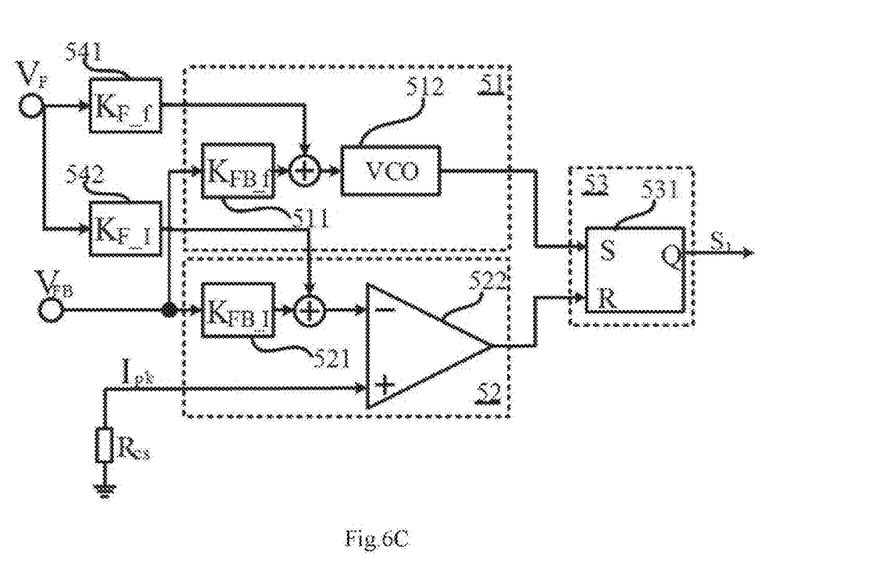

FIG. 6A~FIG. 6C are three other embodiments of the control circuit 50 according to the present disclosure. Referring to FIG. 6A, the control circuit 50 may further include a third regulator 541, configured to receive a preset voltage signal $V_F$ and output a third control signal to add with the first control signal, wherein the third regulator 541 has a third regulation coefficient $K_{F\_f}$ greater than zero.

In FIG. 6A, the first control signal and the third control signal are superposed to to output to the voltage-controlled oscillator 512. That is, the frequency control signal is simultaneously controlled by the feedback voltage $V_{FB}$ and the preset voltage $V_F$, so the formula of the switching frequency $f_s$ can be obtained:

$$f_s = K_{FB\_f}V_{FB} + K_{F\_f}V_F \quad (9)$$

wherein $K_{FB\_f}$ is a first regulation coefficient, and $K_{F\_f}$ is a third regulation coefficient, both of which are positive values.

The peak current control signal is controlled by the feedback voltage $V_{FB}$. So the formula can be obtained:

$$K_{FB\_I}V_{FB} = R_{CS}I_{pk} \quad (10)$$

wherein $K_{FB\_I}$ is a second regulation coefficient, which is a positive value, and $R_{cs}$ is a current sensing resistance.

Based on Formula (1), (9) and (10), a relation between the switching frequency $f_s$ and the output power $P_o$ may be obtained as below:

$$P_o = \frac{1}{2}L_m\left(\frac{K_{FB\_I}(f_s - K_{F\_f}V_F)}{K_{FB\_f}R_{CS}}\right)^2 f_s \quad (11)$$

Based on Formula (11), a first derivative of the switching frequency $f_s$ with respect to the output power $P_o$ may be obtained, that is, the derivative of $f_s$ with respect to $P_o$ is as below:

$$\frac{df_s}{dP_o} = \frac{1}{K(3f_s - A)(f_s - A)} \quad (12)$$

wherein:

$$K = \frac{L_m}{2}\left(\frac{K_{FB\_I}}{K_{FB\_f}R_{CS}}\right)^2 \quad (13)$$

$$A = K_{F\_f}V_F \quad (14)$$

Based on Formula (10) and the feedback voltage $V_{FB}$ satisfies $V_{FB}>0$, it can be known:

$$f_s = K_{FB\_f}V_{FB} + K_{F\_f}V_F = K_{FB\_f}V_{FB} + A > A \quad (15)$$

As can be known from Formula (12), when $f_s>A$, the slope of the switching to frequency $f_s$ with respect to the output power $P_o$ is decreased with the increase of $f_s$ and is decreased with the increase of $P_o$. By setting different $V_F$, $K_{F\_f}$, $K_{FB\_f}$ and $K_{FB\_I}$, different $P_{th}$ and output power points $P_{O\_BST\_in}$ may be set.

In should be noted, the above formulas are valid when $f_s > f_{set}$. Wherein, $f_{set}$ needs to satisfy Therefore, as can be known from Formula (14) and (15), regulation coefficients need to satisfy:

$$K_{F\_f}V_F \leq \text{fset, wherein fset} \geq 20 \text{ kHz} \quad (16)$$

In the embodiment as shown in FIG. 6B, the control circuit 50 may further include a fourth regulator 542, which is configured to receive a preset voltage signal $V_F$ and output a fourth control signal to add with the second control signal, wherein the fourth regulator has a fourth regulation coefficient $K_{F\_I}$ greater than zero.

In FIG. 6B, the peak current control signal is controlled by the feedback voltage $V_{FB}$ and the preset voltage $V_F$. Therefore, formula of the peak value of the current $I_{pk}$ may be obtained:

$$K_{FB\_I}V_{FB} + K_{F\_I}V_F = R_{CS}I_{pk} \quad (17)$$

wherein $K_{FB\_I}$ is a second regulation coefficient, $K_{F\_I}$ is a fourth regulation coefficient, both of which are positive values, and $R_{cs}$ is a current sensing resistance.

The frequency control signal is controlled by the feedback voltage $V_{FB}$, the formula of the switching frequency $f_s$ may be obtained:

$$f_s = K_{FB\_f}V_{FB} \quad (18)$$

wherein $K_{FB\_f}$ is a first regulation coefficient, which is a positive value.

Based on Formula (1), (17) and (18), a relation between the switching frequency $f_s$ and the output power $P_o$ may be obtained as below:

$$P_o = \frac{1}{2}L_m\left(\frac{K_{FB\_I}\frac{f_s}{K_{FB\_f}} + K_{F\_I}V_F}{R_{CS}}\right)^2 f_s \quad (19)$$

Based on Formula (19), a first-order derivative of the switching frequency $f_s$ with respect to the output power $P_o$ may be obtained, that is, the slope of $f_s$ with respect to $P_o$ is as below:

$$\frac{df_s}{dP_o} = \frac{1}{K(3f_s + A)(f_s + A)} \quad (20)$$

wherein:

$$K = \frac{L_m}{2}\left(\frac{K_{FB\_I}}{K_{FB\_f}R_{CS}}\right)^2 \quad (21)$$

$$A = \frac{K_{F\_I}K_{FB\_f}}{K_{FB\_I}}V_F \quad (22)$$

As can be known from Formula (20), when $f_s>0$, the derivative of the switching frequency $f_s$ with respect to the output power $P_o$ is decreased with the increase of $f_s$ and is decreased with the increase of $P_o$. By adjusting values of $V_F$, $K_{F\_I}$, $K_{FB\_f}$ and $K_{FB\_I}$, different $P_{th}$ and output power points $P_{O\_BST\_in}$ may be achieved.

In the embodiment as shown in FIG. 6C, the control circuit 50 may simultaneously include the third regulator 541 and the fourth regulator 542. The third control signal is added to the first control signal, and the fourth control signal is added to the second control signal.

So the peak current control signal is controlled by the feedback voltage $V_{FB}$ and the preset voltage $V_F$. Therefore, the formula of the peak value of the current $I_{pk}$ may be obtained:

$$K_{FB\_I}V_{FB} + K_{F\_I}V_F = R_{CS}I_{pk} \quad (23)$$

wherein $K_{FB\_I}$ is a second regulation coefficient, $K_{F\_I}$ is a fourth regulation coefficient, both of which are positive values, and $R_{cs}$ is a current sensing resistance.

The frequency control signal is controlled by the feedback voltage $V_{FB}$ and the preset voltage $V_F$, and the formula of the switching frequency $f_s$ can be obtained:

$$f_s = K_{FB\_f}V_{FB} + K_{F\_f}V_F \quad (24)$$

wherein $K_{FB\_f}$ is a first regulation coefficient, and $K_{F\_f}$ is a third regulation coefficient, both of which are positive values.

Based on Formula (1), (23) and (24), a relation between the switching frequency $f_s$ and the output power $P_o$ may be obtained as below:

$$P_o = \frac{1}{2}L_m\left(\frac{K_{FB\_I}f_s - K_{F\_f}V_F K_{FB\_I} + K_{F\_I}V_F K_{FB\_f}}{K_{FB\_f}R_{CS}}\right)^2 f_s \quad (25)$$

Based on Formula (25), a first-order derivative of the switching frequency $f_s$ with respect to the output power $P_o$ may be obtained, that is, the slope of $f_s$ with respect to $P_o$ is as below:

$$\frac{df_s}{dP_o} = \frac{1}{K(3f_s - A)(f_s - A)} \quad (26)$$

wherein:

$$K = \frac{L_m}{2}\left(\frac{K_{FB\_I}}{K_{FB\_f}R_{CS}}\right)^2 \quad (27)$$

$$A = \left(K_{F\_f} - \frac{K_{F\_I}}{K_{FB\_I}}K_{FB\_f}\right)V_F \quad (28)$$

Based on Formula (24) and $V_{FB}$ is satisfied $V_{FB}>0$, it can be known:

$$f_s = K_{FB\_f}V_{FB} + \left(K_{F\_f} - \frac{K_{F\_I}}{K_{FB\_I}}K_{FB\_f}\right)V_F = K_{FB\_f}V_{FB} + A > A \quad (29)$$

As can be known from Formula (24), when $f_s>A$, the derivative of the switching frequency $f_s$ with respect to the output power $P_o$ is decreased with the increase of $f_s$ and is decreased with the increase of $P_o$. By setting different $V_F$, $K_{F\_f}$, $K_{F\_I}$, $K_{FB\_f}$ and $K_{FB\_I}$, different $P_{th}$ and output power points $P_{O\_BST\_in}$ may be achieved.

Similarly, the above formulas are valid when $f_s > f_{set}$. Wherein, $f_{set}$ needs to satisfy $f_{set} \geq 20$ kHz. Therefore, as can be known from Formula (28) and (29), regulation coefficients need to satisfy:

$$\frac{K_{FB\_f}}{K_{FB\_I}} K_{F\_f} V_F \leq fset \qquad (30)$$

wherein $$fset \geq 20 \text{ kHz}$$

In conclusion, according to the embodiments provided by the present disclosure, by regulating the switching frequency and the peak value of the current based on a feedback voltage of the flyback converter, or by regulating the switching frequency and peak value of the current based on a feedback voltage and a present voltage signal, a higher peak value of the current and a lower switching frequency may be ensured before flyback converter enters into a burst mode, and the flyback converter has a lower output power when it enters into the burst mode. In this way, the efficiency at light load condition and acoustic noise performance can be improved simultaneously, and thus the flyback converter has a higher light load efficiency and a lower acoustic noise.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the claims.

What is claimed is:

1. A flyback converter, comprising:
    a transformer, comprising a primary winding and a secondary winding;
    a primary side switch electrically coupled to the primary winding;
    a feedback circuit, configured to detect an output voltage of a load and output a feedback voltage signal;
    a current detecting circuit, configured to detect current flowing through the primary side switch and output a current signal; and
    a control circuit, coupled to the feedback circuit and the current detecting circuit, and configured to respectively receive the feedback voltage signal and the current signal, and output a switch control signal to the primary side switch; wherein
    the control circuit is further configured to control a switching frequency of the primary side switch to increase with increase of an output power, and an increasing speed of the switching frequency to decrease with the increase of the output power, causing a derivative of the switching frequency with respect to the output power to decrease with the increase of the switching frequency.

2. The flyback converter according to claim 1, wherein the control circuit comprises:

a frequency regulator, configured to receive the feedback voltage signal and output a frequency control signal;
a current regulator, provided with a first input terminal configured to receive the feedback voltage signal, and a second input terminal configured to receive the current signal and output a peak current control signal; and
a switch signal regulator, configured to respectively receive the frequency control signal and the peak current control signal, and output the switch control signal to a control terminal of the primary side switch.

3. The flyback converter according to claim 2, wherein the frequency regulator comprises:
    a first regulator, configured to receive the feedback voltage signal and output a first control signal, the first regulator having a first regulation coefficient greater than zero; and
    a voltage-controlled oscillator, configured to receive the first control signal and output the frequency control signal.

4. The flyback converter according to claim 2, wherein the current regulator comprises:
    a second regulator, configured to receive the feedback voltage signal and output a second control signal, the second regulator having a second regulation coefficient greater than zero; and
    a comparator, provided with an inverting input terminal configured to receive the second control signal, and a noninverting input terminal configured to receive the current signal and output the peak current control signal.

5. The flyback converter according to claim 2, wherein the control circuit comprises:
    a third regulator, configured to receive a preset voltage signal and output a third control signal to add with the first control signal, the third regulator having a third regulation coefficient greater than zero.

6. The flyback converter according to claim 2, wherein the control circuit comprises:
    a fourth regulator, configured to receive a preset voltage signal and output a fourth control signal to add with the second control signal, the fourth regulator having a fourth regulation coefficient greater than zero.

7. The flyback converter according to claim 2, wherein the switch signal regulator comprises:
    a trigger, provided with a first input terminal coupled to the frequency regulator, a second input terminal coupled to the current regulator, and an output terminal coupled to the control terminal of the primary side switch.

8. The flyback converter according to claim 1, wherein the switching frequency of the primary side switch is greater than or equal to a threshold.

9. The flyback converter according to claim 8, wherein the threshold is greater than or equal to 20 kHz.

10. A control method of a flyback converter, comprising:
    detecting an output voltage of a load and generating a feedback voltage signal;
    detecting a current flowing through a primary side switch and generating a current signal; and
    generating a switch control signal based on the feedback voltage signal and the current signal to control a switching frequency of the primary side switch to increase with increase of an output power, and an increasing speed of the switching frequency to decrease with the increase of the output power, causing a derivative of the switching frequency with respect to the output power to decrease with the increase of the switching frequency.

11. The control method according to claim 10, further comprising:
outputting a first control signal based on the feedback voltage signal and a first regulation coefficient, wherein the first regulation coefficient is greater than zero; and
providing a voltage-controlled oscillator to output a frequency control signal based on the first control signal.

12. The control method according to claim 10, further comprising:
outputting a second control signal based on the feedback voltage signal and a second regulation coefficient, wherein the second regulation coefficient is greater than zero; and
providing a comparator to output a peak current control signal based on the second control signal and the current signal.

13. The control method according to claim 10, further comprising:
receiving a preset voltage signal.

14. The control method according to claim 13, further comprising:
outputting a third control signal based on the preset voltage signal and a third regulation coefficient, and
adding the third control signal with the first control signal, wherein the third regulation coefficient is greater than zero.

15. The control method according to claim 13, further comprising:
outputting a fourth control signal based on the preset voltage signal and a fourth regulation coefficient, and
adding the fourth control signal with the second control signal, wherein the fourth regulation coefficient is greater than zero.

16. The control method according to claim 12, further comprising:
providing a trigger to generate the switch control signal based on the frequency control signal and the peak current control signal.

17. The control method according to claim 10, wherein the switching frequency of the primary side switch is great than or equal to a threshold.

18. The control method according to claim 17, wherein the threshold is greater than or equal to 20 kHz.

* * * * *